United States Patent [19]

Bokelmann

[11] 4,102,619
[45] Jul. 25, 1978

[54] APPARATUS FOR PRODUCING FOAM SLABS OF RECTANGULAR CROSS-SECTION

[75] Inventor: Horst Bokelmann, Bad Wildungen, Fed. Rep. of Germany

[73] Assignee: Metzeler Schaum GmbH, Memmingen, Fed. Rep. of Germany

[21] Appl. No.: 800,604

[22] Filed: May 25, 1977

Related U.S. Application Data

[62] Division of Ser. No. 676,603, Apr. 13, 1976, Pat. No. 4,056,595.

[30] Foreign Application Priority Data

Apr. 22, 1975 [DE] Fed. Rep. of Germany ....... 2517664

[51] Int. Cl.² ............................................. B29D 27/04
[52] U.S. Cl. ...................................... 425/89; 425/224; 425/329; 425/817 C
[58] Field of Search ...................... 264/46.3, 51, 216; 156/77, 78, 79; 425/89, 115, 4 C, 817 C, 224, 329, 471

[56] References Cited

U.S. PATENT DOCUMENTS

| 3,562,767 | 2/1971 | Mallet et al. | 425/4 C |
| 3,936,254 | 2/1976 | Sawada et al. | 425/89 |
| 3,984,195 | 10/1976 | Del Carpio | 425/817 C X |
| 3,999,230 | 12/1976 | Bruning | 425/817 C X |

Primary Examiner—Francis S. Husar
Assistant Examiner—Mark Rosenbaum
Attorney, Agent, or Firm—Burgess, Dinklage & Sprung

[57] ABSTRACT

In an apparatus for the continuous production of rectangular foam slabs wherein a foamable reaction mixture is foamed on a forwardly moving floor web and lateral confining webs, and in which a cover web is applied during the foaming process to the surface of the rising foam, the improvement which comprises means for supplying said cover web from a supply to the surface under controllable tension, thereby exercising a controllable pressure on the surface of the rising foam, removing the cover web from the foam surface beyond the point at which the rising mixture has substantially reached its maximum height and passing the web rearwardly and then forwardly to serve as the floor web for receiving further foamable mixture. Advantageously the cover web is heated before application to the foaming mixture, it is pressed against the foam surface with a pressure of about 2 to 4 kilograms per square meter, it is removed from the foam surface about 2 to 4 meters downstream of where the foam mixture has reached its maximum height, and it is dried before it becomes the floor web. The apparatus includes vertically adjustable transversely extending horizontal control members governing the locations where the cover web contacts and leaves the foam surface. The control members may be as long as the cover web is wide or they may be from about 15 to 25 cm shorter.

6 Claims, 4 Drawing Figures

APPARATUS FOR PRODUCING FOAM SLABS OF RECTANGULAR CROSS-SECTION

This is a division of application Ser. No. 676,603 filed Apr. 13, 1976, now U.S. Pat. No. 4,056,595.

BACKGROUND

It is known in the continuous manufacture of rectangular foam slabs, in which a foamable polyurethane reaction mixture is freely foamed, to apply a gas-permeable overlay to the free surface of the rising foam during the foaming process. Such an overlay is intended to prevent the formation of a convexly curved surface on the foam slab during the blowing. The curvature is produced on the one hand by the sticking of the flanks of the slab or strand to the lateral boundary surfaces of the apparatus, and on the other hand by the formation of a solid skin on the top, which stretches arcuately. This undesirable cupping is supposed to be prevented by the known methods by having the overlay keep the surface of the slab flat.

From German "Offenlegungsschrift" No. 2,123,216, it is known to lay gas-permeable webs on the rising foam underneath a lattice-like or jalousie-like decking for the production of rectangular soft foam slabs. The gas-permeable web is intended to eliminate the danger that the decking might sink into the foam mixture.

The apparatus of "Offenlegungsschrift" No. 2,123,216, has, however, the disadvantage that the decking for the equalization of the foam surface is contaminated by the rising mixture. Therefore, German "Offenlegungsschrift" No. 2,165,902 provides that the gas-permeable web itself is in turn covered by an impermeable shielding web which is intended to prevent the foam mixture from wetting the superimposed equalization means.

The above-described, known methods have the disadvantage that the gas-permeable web is clogged at least in part by the rising foam mixture and thus the uniform removal of the evolving reaction gas, which emerges from the foam surface especially after the end of the foaming process, is not assured. Furthermore, the use of a gas-permeable web which is removed from the foam slab after it has set and then discarded adds undesirably to the cost of the process. The use of an additional, fluid-tight shielding web, which consists for example of paper, makes the process still more expensive and complicated.

THE INVENTION

The object of the present invention therefore consists in devising an improved apparatus for making rectangular foam slabs, whereby it will be possible to minimize the rejection of material through an optimum control of the cross-sectional dimensions of the foam slab during the foaming process, and at the same time improve production by a simpler and better arrangement of the apparatus.

By employing the apparatus of the invention there is provided a method for the continuous production of rectangular foam slabs, in which a foamable reaction mixture, especially a polyurethane reaction mixture, is foamed on a forwardly moving floor web carried by a lowerable conveyor belt, and in which a covering web is applied to the surface of the rising foam during the foaming process, the method being characterized in that the web applied to the surface is under a controllable tension, and thus exercises a controllable pressure on the surface of the rising foam, the web is removed from the foam surface approximately at the point at which the foaming process is completed, the removed web is carried back against the direction of transport and dried, and is then returned to the process as a floor web.

The pressure which the covering web controlledly exercises on the foam surface through a drag roll and, in some cases, an additional roll is approximately from 1 to 6, and especially 2 to 4, kilograms per square meter. The pressure to be applied will depend on the formula of the foam mixture. Fluid foam mixtures require lower covering web pressure than viscous foam mixtures. The pressure of the covering web on the surface of the foam mixture is produced by the drag roll. The drag roll is driven by a motor, an oil motor for example. By the reduction of the rotatory speed of the drag roll, the web which is advancing at the same speed in the foaming channel as the foam slab, is correspondingly tightened and thus the pressure on the foam slab surface is increased.

The apparatus further includes a lowerable conveyor belt, systems for mixing and feeding the reaction mixture, vertical webs serving as walls for the lateral limiting of the rectangular foam slab, a floor web on the lowerable conveyor belt, and an upper covering web, the apparatus being characterized by a uniform, continuous web forming the covering web and the floor web, a supply roll, a drag roll, vertically and horizontally adjustable control rolls, a heating element and idle rolls for the guidance of the web.

The control rolls and additional roll, if used, have a maximum length which corresponds to the width of the foam slabs, i.e., up to about 2.25 m. However, rolls can be used having a length approximately 5 to 20%, and especially about 10 to 15%, smaller than the corresponding slab width. In this manner the slab width can be increased or reduced during the foaming process by from 5 to 20%, and especially by 10 to 15%, without the need to replace the rolls.

The continuous covering web and floor web preferably covers the entire width of the foam slab surface. The upper section is lifted away from the foam surface by passing around the control roll at a moment shortly following the transition of the foam from the plastic to the solid state, at which time most of the gas formed in the reaction begins to escape. This point is located about 1 to 6 meters, especially 2 to 4 meters, after the point at which the rising mixture has reached its greatest height.

In the present invention, the foam mixture is, for example, a polyether or polyester-polyurethane foam.

The conveyor belt can be lowered vertically also during the foaming. The angle at which it is lowered from the horizontal amounts to as much as 10°, and especially 3° to 4°.

The apparatus of the invention is especially suited for the production of rectangular soft foam slabs.

The apparatus of the invention will now be further described with reference to the drawings, wherein FIG. 1 is a side elevational view of the apparatus of the invention, and FIGS. 2 and 4 are cross-sectional views taken along lines A—A, B—B and C—C through the apparatus of FIG. 1.

In FIG. 1 there is shown a supply roll 1 from which a web 4, preferably a paper web, is delivered over a drag roll 3 to the surface of the rising foam. If desired, a device 2 can be disposed between the supply roll 1 and the drag roll 3 for folding over or trimming the edges of the web 4. The point at which the web is laid on the surface of the foam is determined by the first horizontally and vertically adjustable control member 5. This point is preferably located where the initially concave surface of the rising foam undergoes a transition to a convex surface. The control member 5 provides so that the web 4 will contact the foam surface without the roll 5 exercising pressure on the foam mixture. At a second horizontally and vertically adjustable control member 7, the covering web is lifted from the surface of the foam slab which has now reached its full height, and after the web has been carried over idle rolls 8 and 8' it passes below a heating element 9 for drying.

The control members 5 and 7, mounted on horizontally shiftable pivoting arms, can be in the form of rolls and/or slides. The control members 5 and 7 can be displaced in the vertical and/or horizontal direction by means of the adjustable pivoting arms. In this manner the point of first contact between the covering web and the reaction liquid and the point of removal from the foamed slab can be precisely adjusted. The control member 5 will be applied preferably at the point at which the initially concave surface of the reaction liquid or foam, as the case may be, undergoes a transition to a convex surface. The position of control member 7 will be preferably such that the slab will already have attained its full height or thickness. The position can be shifted, however, to any desired point within a relatively great length. The covering web can be lifted away shortly before or after the end of the liquid phase range of the foam. It is also possible, however, to refrain from removing the web until after the pores of the foam have burst open.

The supply roll 1 can be associated, if desired, with an edge cutting means 2 which laterally seams the covering web 4. The control roll 5 can be preceded, if desired, by a heating element 15 which heats the web 4 before it is applied to the surface of the foam mixture. Between the control members 5 and 7 there can be provided in some cases, if the reaction mixture requires it, an additional horizontally and vertically adjustable roll or slide 6.

In addition to conventional heating elements which are capable of drying the covering web while it is moving past them, infrared heating systems are especially suitable.

By means of idle rolls 10 and 11 assurance is provided that the web will be kept in alignment with the conveyor belt until it meets it and will remain centered thereon.

Two lateral webs 12 and 12', which consist for example of paper or flexible plastic material, are joined to the floor web 4 by means of inserted strips of paper, for example, which have been folded at an angle. The joint can be produced, however, also by causing the side webs 12 and 12' to be folded around slightly laterally and then to be laid on top of or underneath the margins of the floor web 4.

The apparatus of the invention can be adjusted with no special difficulty to different slab or block widths. All that is needed is to shift the side webs laterally. If the width of the foam slab is increased by more than about 20 to 25 cm, it will be necessary to replace the control members 5 and 7 on the shiftable pivoting arms with correspondingly longer ones. The width set in the apparatus can be increased during the foaming process from, for example, 2 m to about 2.25 m, without the need to replace the control members 5 and 7 with longer control members. The apparatus will produce perfect slabs even if the members 5 and 7 are as much as about 15, and even about 25, cm narrower than the slab being formed.

The foam film adhering to the removed covering web is uniformly spread out over the web and is very thin. The weight of this film amounts to about 50 to 150 $g/m^2$ depending on whether the covering web is not pulled off until after the pores burst or whether it is pulled off beforehand from the still liquid to semisolid foam surface.

FIG. 2 shows a cross section taken along line A—A through the apparatus of the invention. The reaction mixture is here restricted by the floor web 4, the side webs 12 and 12' and the covering web 4. The control member 5 extends over virtually the entire surface of the foaming reaction mixture. The laterally shiftable supporting surfaces of the foam channel have been omitted, as they have in FIG. 1.

FIG. 3 shows a cross section taken through the apparatus along line B—B.

Figure 1:
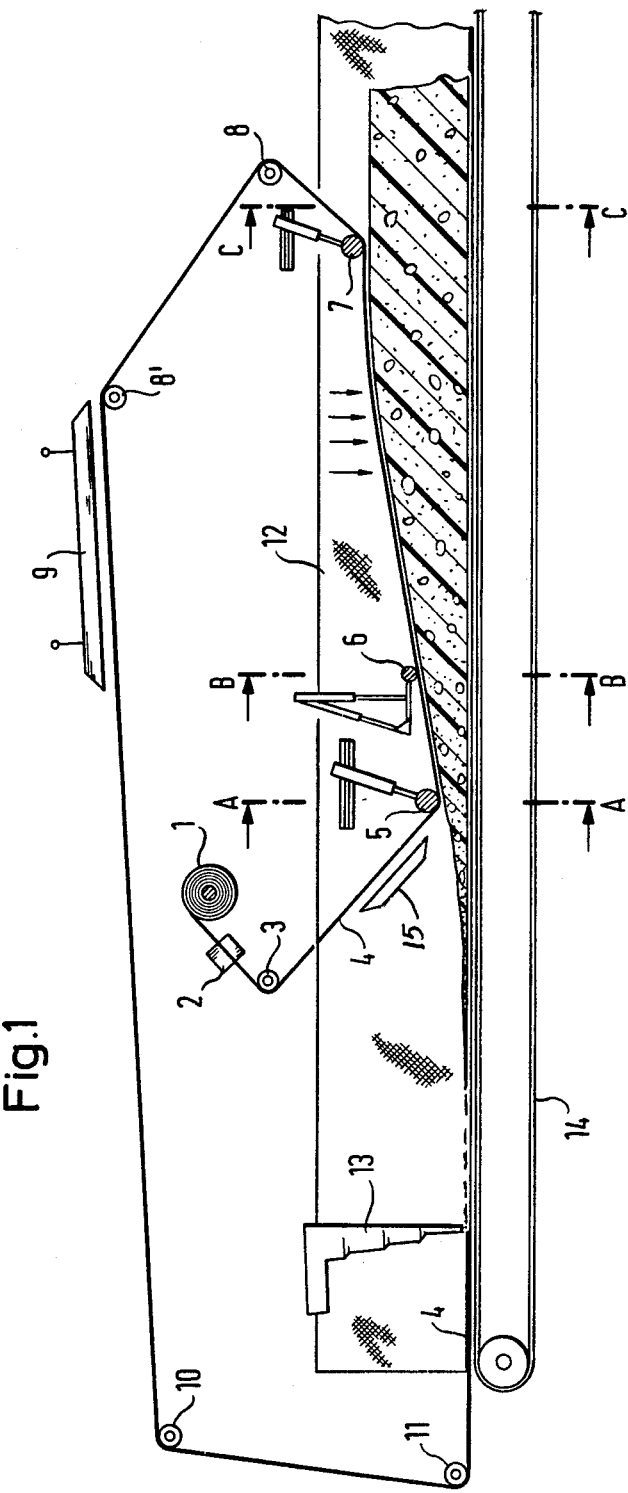
Figure 2:
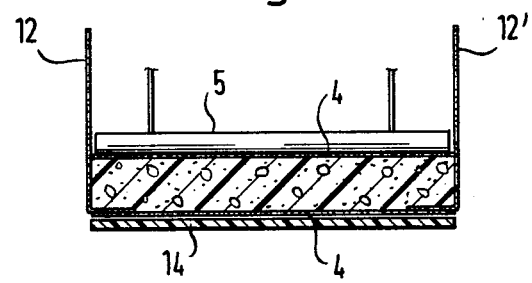
Figure 3:
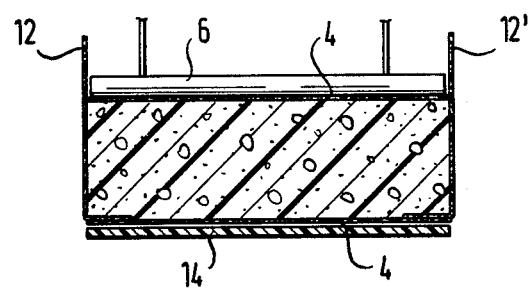
FIG. 3 shows a cross section taken through an embodiment of the invention in which an additional pressure roll 6 is used for the equalization of the surface.
Figure 4:
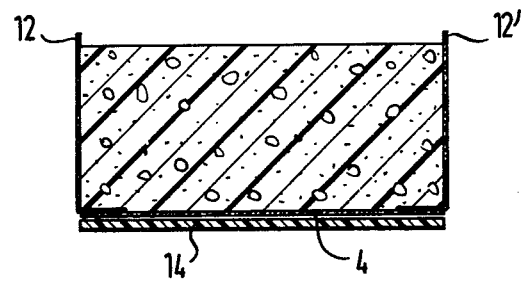
FIG. 4 shows a cross sectional view taken through the apparatus of the invention along line C—C of FIG. 1. The covering web has been lifted from the surface.

The principal advantages of the method and apparatus of the invention lie in the fact that the web 4 running over the control members 5 and 7 represents a new means of applying the web which is much simpler than the known web applying means in the form of bars coupled together or individually laid-on bars or slide members. The pressure acting on the surface can be regulated substantially more accurately and with great precision. This regulation is accomplished especially by the drag roll 3 and additionally, if desired, by roll 6. The rising foam mass can thus foam up freely without the danger of collapsing the foam by locally excessive downward pressure.

The upper web is used as a floor web, which makes the process particuarly economical.

The synchronization between the upper web and the foam slab and between the speed of the upper web and the floor web is provided by the simple fact that the floor web and the covering web are not separate but consist of a single web. This prevents the exercise of shear forces on the foam in the process of the invention, which are caused when the floor web and the cover web move at different speeds. These shear forces can result in an uneven surface on the foam slab or in cracks in the foam slab.

The foam blocks or slabs produced with the apparatus of the invention have no differences in density either horizontally or vertically. The surface and side walls of the slabs are flat and display no unevenness.

With the apparatus of the invention, foam slabs can be produced having a thickness of 1.10 to 1.25 m and a width up to 2.25 m. The thickness of the foam slabs, however, is not limited by the method or by the apparatus. The rate of advancement of the foam slab, which depends in part on the chemical composition of the foam mixture, amounts to about 3 to 10, and especially 5.5 to 8, meters per minute.

It will be appreciated that the instant specification and examples are set forth by way of illustration and not limitation, and that various modifications and changes may be made without departing from the spirit and scope of the present invention.

I claim:

1. In the apparatus for the continuous production of rectangular foam slabs by foaming a reaction mixture, the apparatus having a conveyor belt for the reaction mixture, a system operatively associated with said conveyor belt for mixing the reaction mixture and feeding it to the belt, a pair of vertical webs as sidewalls for the lateral confinement of the rectangular foam slab resulting upon foaming of the reaction mixture while on the belt, a floor web on the conveyor belt and and a cover web for the foam slab, the improvement which comprises means operatively associated with said belt for removing said cover web from a foam surface downstream of the feeding system, means operatively associated with said conveyor belt for twice reversing the direction of advance of said removed cover so as to form a loop, and means operatively associated with said conveyor belt for advancing the twice reversed cover web to serve as the floor web for subsequently fed reaction mixture.

2. An apparatus according to claim 1, including a pair of horizontal height control members extending transversely of the foam surface, and means operatively associated with said control members for adjusting the vertical location of said control members, said cover web being trained about said control members with one located approximately after where the foam starts rising and the other where the foam has reached its full height.

3. An apparatus according to claim 2, wherein said control members range in length from the width of the cover web down to about 15 to 25 cm shorter than the width of the cover web.

4. An apparatus according to claim 1, including means for heating the cover web before it contacts the foam surface.

5. An apparatus according to claim 1, including means for heating the cover web after it has been removed from the foam surface but before it has become the floor web, thereby to dry any foam contained thereon.

6. An apparatus according to claim 3, including means for heating the cover web before it contacts the foam surface, and means for heating the cover web after it has been removed from the foam surface but before it has become the floor web, thereby to dry any foam contained thereon.

* * * * *